United States Patent
Yeo et al.

(10) Patent No.: US 8,665,547 B1
(45) Date of Patent: Mar. 4, 2014

(54) DISK DRIVE MULTIPLEXING READ SIGNAL AND FLY HEIGHT SIGNAL TO A TRANSMISSION LINE

(75) Inventors: Teik Ee Yeo, Trabuco Canyon, CA (US); Piero Giaccone, San Jose, CA (US); Khoa Xuan Bui, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 12 days.

(21) Appl. No.: 13/588,999

(22) Filed: Aug. 17, 2012

(51) Int. Cl.
 *G11B 5/02* (2006.01)
(52) U.S. Cl.
 USPC .............................................. 360/55; 360/75
(58) Field of Classification Search
 None
 See application file for complete search history.

(56) References Cited

U.S. PATENT DOCUMENTS

| | | | |
|---|---|---|---|
| 4,812,927 A | 3/1989 | Fechner | |
| 5,130,866 A | 7/1992 | Klaassen et al. | |
| 5,233,482 A | 8/1993 | Galbraith et al. | |
| 5,377,058 A * | 12/1994 | Good et al. | 360/75 |
| 5,450,747 A | 9/1995 | Flechsig et al. | |
| 5,563,746 A | 10/1996 | Bliss | |
| 5,701,314 A | 12/1997 | Armstrong et al. | |
| 5,808,184 A | 9/1998 | Boutaghou et al. | |
| 5,817,931 A | 10/1998 | Boutaghou | |
| 5,825,181 A | 10/1998 | Schaenzer et al. | |
| 5,870,241 A | 2/1999 | Ottesen et al. | |
| 5,898,532 A | 4/1999 | Du et al. | |
| 6,019,503 A | 2/2000 | Abraham et al. | |
| 6,038,091 A | 3/2000 | Reed et al. | |
| 6,049,763 A | 4/2000 | Christiansen et al. | |
| 6,052,243 A | 4/2000 | Shimada | |
| 6,057,975 A | 5/2000 | Yaeger et al. | |
| 6,088,176 A | 7/2000 | Smith et al. | |
| 6,181,520 B1 | 1/2001 | Fukuda | |
| 6,196,062 B1 | 3/2001 | Wright et al. | |
| 6,262,572 B1 | 7/2001 | Franco et al. | |
| 6,293,135 B1 | 9/2001 | Marchon et al. | |
| 6,310,739 B1 | 10/2001 | McEwen et al. | |
| 6,311,551 B1 | 11/2001 | Boutaghou | |
| 6,414,806 B1 | 7/2002 | Gowda et al. | |
| 6,452,735 B1 | 9/2002 | Egan et al. | |
| 6,494,085 B2 | 12/2002 | Wakefield et al. | |
| 6,577,466 B2 | 6/2003 | Meyer et al. | |
| 6,580,572 B1 | 6/2003 | Yao et al. | |
| 6,623,158 B2 | 9/2003 | Abraham et al. | |
| 6,754,015 B2 | 6/2004 | Erden et al. | |
| 6,865,040 B2 | 3/2005 | Fayeulle et al. | |
| 6,899,456 B2 | 5/2005 | Sundaram et al. | |
| 6,940,669 B2 | 9/2005 | Schaenzer et al. | |

(Continued)

FOREIGN PATENT DOCUMENTS

| | | |
|---|---|---|
| EP | 00783168 A2 | 9/1997 |
| GB | 02342491 B | 12/2002 |
| WO | WO9918575 A1 | 4/1999 |

*Primary Examiner* — Thang Tran

(57) ABSTRACT

A disk drive is disclosed comprising a disk comprising a plurality of servo tracks defined by servo sectors, and a head actuated over the disk, wherein the head comprises a read element operable to generate a read signal. The disk drive further comprises a fly height sensor operable to generate a fly height signal for the head, and control circuitry comprising a multiplexer operable to multiplex the read signal and the fly height signal to a transmission line. The multiplexer is configured to select the read signal when reading the servo sectors of a servo track, and configured to select the fly height signal when reading a segment of the servo track between consecutive servo sectors.

19 Claims, 3 Drawing Sheets

(56) References Cited

U.S. PATENT DOCUMENTS

| | | |
|---|---|---|
| 7,064,659 B2 | 6/2006 | Baumgartner et al. |
| 7,121,133 B2 | 10/2006 | Chu et al. |
| 7,253,984 B1 * | 8/2007 | Patapoutian et al. ........... 360/75 |
| 7,382,565 B2 | 6/2008 | Khurshudov et al. |
| 7,425,719 B2 | 9/2008 | Treves et al. |
| 7,551,384 B1 * | 6/2009 | McFadyen et al. ............. 360/75 |
| 7,656,763 B1 | 2/2010 | Jin et al. |
| 7,679,853 B2 | 3/2010 | Song et al. |
| 7,684,138 B2 | 3/2010 | Kitamura et al. |
| 7,780,344 B2 | 8/2010 | Yanagisawa et al. |
| 7,929,235 B2 | 4/2011 | Meier et al. |
| 2002/0154430 A1 | 10/2002 | Rae et al. |
| 2008/0262643 A1 | 10/2008 | Creigh et al. |
| 2013/0155538 A1 * | 6/2013 | Contreras ...................... 360/46 |

\* cited by examiner

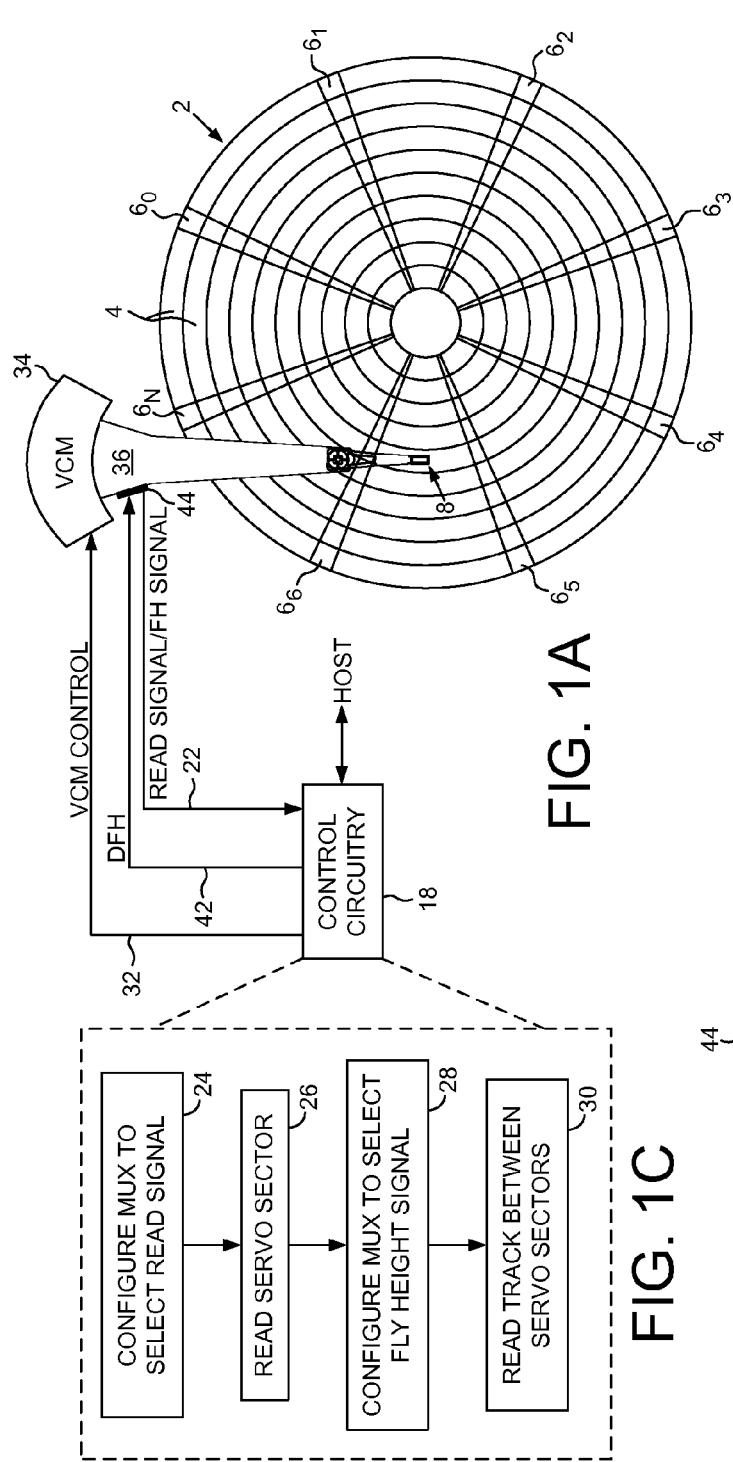
FIG. 1A
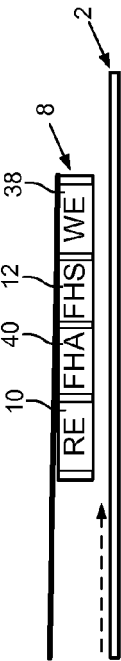
FIG. 1B
FIG. 1C
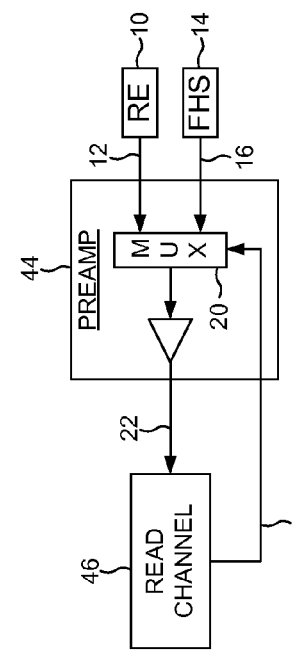
FIG. 1D

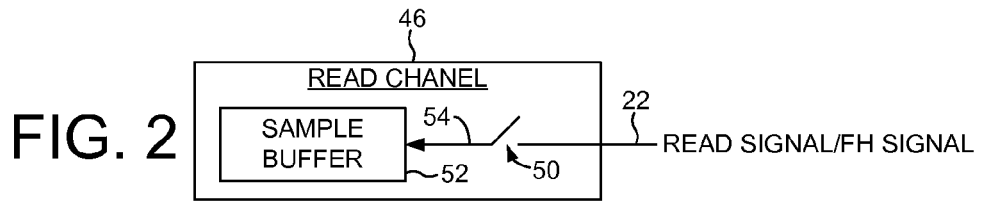
FIG. 2
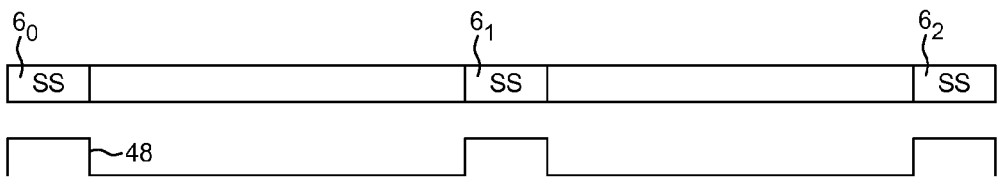
FIG. 3
FIG. 4
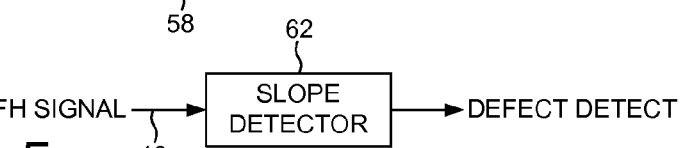
FIG. 5
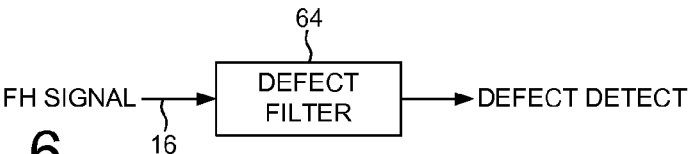
FIG. 6
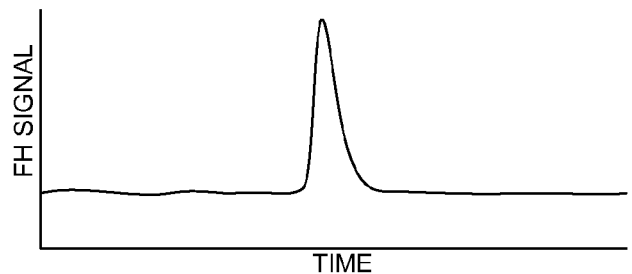
FIG. 7A
FIG. 7B

DISK DRIVE MULTIPLEXING READ SIGNAL AND FLY HEIGHT SIGNAL TO A TRANSMISSION LINE

BACKGROUND

Disk drives comprise a disk and a head connected to a distal end of an actuator arm which is rotated about a pivot by a voice coil motor (VCM) to position the head radially over the disk. The disk typically comprises a number of concentric data tracks each partitioned into a number of data sectors. Access operations are performed by seeking the head to a target data track, and performing a write/read operation on the data sectors within the data track. The disk typically comprises embedded servo sectors having position information recorded therein, such as coarse position information (e.g., a track address) and fine position information (e.g., servo bursts). A servo controller processes the servo sectors to position the head over the target data track.

Each data sector is typically assigned a physical block address (PBA) which is accessed indirectly through a logical block address (LBA) to facilitate mapping out defective data sectors. A PBA associated with defective data sectors may simply remain unmapped if found during manufacturing, or if a data sector becomes defective while in-the-field (grown defect), the LBA may be remapped to the PBA of a spare data sector (and the data relocated to the spare data sector). The process of initially mapping the LBAs to PBAs and mapping out defective PBAs is referred to as "formatting" the disk.

BRIEF DESCRIPTION OF THE DRAWINGS

FIG. 1A shows a disk drive according to an embodiment of the present invention comprising a head actuated over a disk.

FIG. 1B shows a head comprising a read element, a write element, a fly height actuator, and a fly height sensor according to an embodiment of the present invention.

FIG. 1C is a flow diagram according to an embodiment of the present invention wherein a read signal and a fly height signal are multiplexed to a transmission line.

FIG. 1D shows an embodiment wherein the control circuitry comprises a preamp comprising a multiplexer for multiplexing the read signal and the fly height signal, and a read channel operable to process the multiplexed signal.

FIG. 2 shows an embodiment of the present invention wherein the read channel comprises a sampling device and a buffer for buffering the signal samples for the read signal and the fly height signal.

FIG. 3 shows an embodiment of the present invention wherein the multiplexer selects the read signal when reading the servo sectors, and selects the fly height signal when reading the segments of a track between the servo sectors.

FIG. 4 shows an embodiment of the present invention wherein a defect is detected by comparing the fly height signal to a threshold.

FIG. 5 shows an embodiment of the present invention wherein a defect is detected by detecting a slope of the fly height signal.

FIG. 6 shows an embodiment of the present invention wherein a defect is detected by correlating the fly height signal with a defect signal representing a defect type.

FIGS. 7A and 7B show an embodiment of the present invention wherein a thermal asperity on the disk causes a corresponding perturbation in the fly height signal.

DETAILED DESCRIPTION

Figure 8:
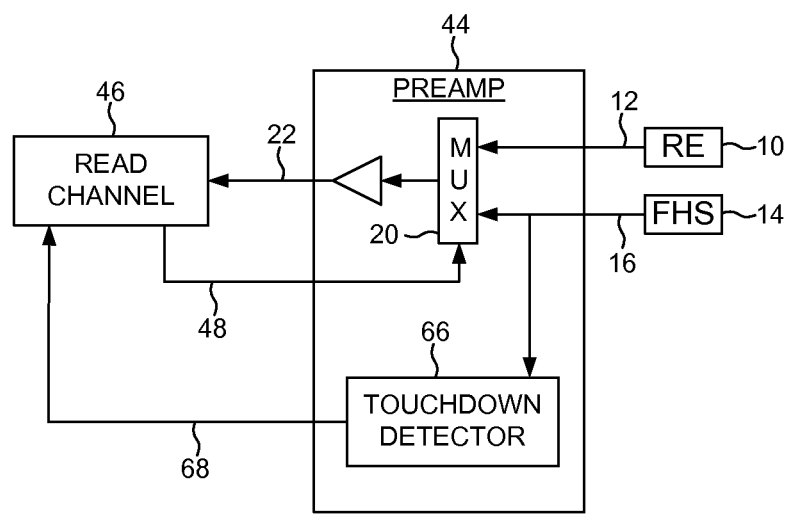
FIG. 8 shows an embodiment of the present invention wherein the preamp comprises a touchdown detector operable to detect a touchdown event in response to the fly height signal, and a second transmission line (e.g., a serial I/O line) operable to transmit the touchdown event to the read channel.

FIG. 1A shows a disk drive according to an embodiment of the present invention comprising a disk 2 comprising a plurality of servo tracks 4 defined by servo sectors $6_0$-$6_N$, and a head 8 actuated over the disk 2, the head 8 comprising a read element 10 operable to generate a read signal 12, and a fly height sensor 14 operable to generate a fly height signal 16 for the head 8 (FIG. 1B). The disk drive further comprises control circuitry 18 comprising a multiplexer 20 operable to multiplex the read signal 12 and the fly height signal 16 to a transmission line 22 (FIG. 1D). The control circuitry 18 is operable to execute the flow diagram of FIG. 1C, wherein the multiplexer 20 is configured to select the read signal (block 24) when reading the servo sectors of a servo track (block 26), and the multiplexer is configured to select the fly height signal (block 28) when reading a segment of the servo track between consecutive servo sectors (block 30).

In the embodiment of FIG. 1A, the control circuitry 18 processes the read signal 12 emanating from the read element 10 to demodulate the servo sectors $6_0$-$6_N$ and generate a position error signal (PES) representing an error between the actual position of the head and a target position relative to a target track. The control circuitry 18 filters the PES using a suitable compensation filter to generate a control signal 32 applied to a voice coil motor (VCM) 34 which rotates an actuator arm 36 about a pivot in order to actuate the head 8 radially over the disk 2 in a direction that reduces the PES. The servo sectors $6_0$-$6_N$ may comprise any suitable head position information, such as a track address for coarse positioning and servo bursts for fine positioning. The servo bursts may comprise any suitable pattern, such as an amplitude based servo pattern or a phase based servo pattern. In one embodiment, a plurality of data tracks may be defined relative to the servo tracks 4, wherein the radial density of the data tracks may be the same or different than the radial density of the servo tracks 4.

The head 8 in the embodiment of FIG. 1B comprises a suitable write element 38 (e.g., a write coil), and a suitable fly height actuator 40, such as a heater or piezoelectric (PZT) actuator. During access operations (write/read), the control circuitry 18 applies a dynamic fly height (DFH) control signal 42 to the fly height actuator 40 in order to achieve an optimal fly height for write/read operations. For example, there may be an optimal fly height during write operations that results in an optimal saturation of the magnetic media, as well as an optimal fly height during read operations that results in an optimal signal-to-noise ratio when reading the magnetic transitions recorded on the disk. In one embodiment, the fly height sensor 12 is used to calibrate the optimal DFH settings for write/read operations. For example, the fly height sensor 12 may be processed to detect a touchdown event for the head in order to correlate the DFH setting with the fly height of the head. In one embodiment, the control circuitry 18 may generate a specific DFH setting to achieve a target fly height while scanning for defects on the disk using the fly height sensor. For example, in one embodiment the DFH setting used for defect detection may correspond to a fly height that is lower than that used for write/read operations in order to improve the accuracy of the defect detection.

In an embodiment shown in FIG. 1D, the control circuitry 18 of FIG. 1A comprises a preamp 44 operable to receive the read signal 12 and the fly height signal 16 over suitable transmission lines fabricated on an interconnect that connects the preamp 44 to the head 8. The preamp 44 further comprises the multiplexer 20 operable to apply one of the read signal 12 and the fly height signal 16 to a transmission line 22 (e.g., fabricated on a flex circuit) coupled to a read channel 46. In one embodiment, the read channel 46 generates a control signal 48 operable to configure the multiplexer 20 in order to process the read signal 12 while reading the servo sectors, and process the fly height signal 16 when detecting defects in the segments of a servo track between the servo sectors.

FIG. 2 shows an embodiment of the present invention wherein the read channel 46 comprises a sampling device 50 operable to sample the read signal 12 when reading the servo sectors and operable to sample the fly height signal 16 when reading the segments of the servo track between the servo sectors. The read channel further comprises a buffer 52 operable to buffer signal samples 54 generated by the sampling device 50. When reading the servo sectors, the signal samples 54 stored in the buffer 52 are processed in order to demodulate the position information derived from the servo data (e.g., track address and servo bursts). When executing a defect scan of the disk, the signal samples 54 stored in the buffer 52 are processed in order to detect defects on the disk. Accordingly, the buffer 52 which has conventionally been used to buffer the signal samples of the read signal 12 during read operations is advantageously also used to buffer signal samples of the fly height signal 16 when executing the defect scan.

FIG. 3 shows an embodiment of the present invention wherein when executing the defect scan the read channel 46 adjusts the control signal 48 applied to the multiplexer 20 in the preamp 44 in order to process the read signal 12 while the head is over the servo sectors, and to process the fly height signal 16 while the head is over the segments of the servo track between the servo sectors. In one embodiment, the read channel 46 may also adjust the dynamic fly height signal 42 (FIG. 1A) in order to establish a first fly height while reading the servo sectors, and to establish a second (e.g., lower) fly height while reading the segments of the servo track between the servo sectors.

A defect on the disk may be detected in response to the fly height signal 16 using any suitable technique. In an embodiment shown in FIG. 4, the fly height signal 16 is compared 56 to a threshold 58 in order to detect a defect. For example, a defect on the disk such (as a thermal asperity 60 shown in FIG. 7A) may cause a pulse in the fly height signal 16 as shown in FIG. 7B which can be detected when the fly height signal 16 exceeds the threshold 58. In an alternative embodiment shown in FIG. 5, a slope detector 62 may evaluate a slope in the fly height signal 16 in order to detect and/or discriminate between different types of defects on the disk. For example, a recess type defect on the disk may induce a pulse in the fly height signal 16 having less aggressive slopes as compared to the pulse induced by a protrusion type defect. In yet another embodiment shown in FIG. 6, a defect filter 64 may process the fly height signal 16 to detect a defect on the disk. The defect filter 64 comprises an impulse response representing a defect signal of a particular defect type (e.g., the pulse shown in FIG. 7B representing a protrusion type defect). The defect filter 64 correlates the defect signal with the fly height signal 16 such that a defect is detected when the correlation exceeds a threshold (i.e., when there is a sufficient match between the defect signal and the fly height signal 16). In one embodiment, multiple defect filters may be employed each comprising an impulse response representing a different defect type, wherein the defect type is identified by the defect filter having the highest amplitude output.

FIG. 8 shows an embodiment of the present invention wherein the fly height sensor 14 comprises a suitable touchdown sensor, such as a magnetoresistive element that generates a pulse response when the head 8 contacts the disk 2 similar to the thermal asperity defect signal shown in FIG. 7B. The preamp 44 in this embodiment comprises a suitable touchdown detector 66 for detecting a head touchdown event in response to the fly height signal 16. For example, the touchdown detector 66 may count the number of times the fly height signal 16 exceeds a threshold over a predetermined interval. The count value (or a flag indicating whether the count exceeds a threshold) may be transmitted to the read channel 46 over a second transmission line 68. In one embodiment, the second transmission line 68 may comprise a serial I/O interface for communicating digital data between the preamp 44 and the read channel 46, whereas the read signal 12 and the fly height signal 16 may be transmitted over the first transmission line 22 to the read channel 46 as a differential analog signal. In one embodiment, the control circuitry 18 may calibrate the dynamic fly height control signal 42 by increasing the power to the fly height actuator 40 until a touchdown event is detected. In one embodiment, the control circuitry 18 may also calibrate the threshold in the touchdown detector 66 prior to calibrating the dynamic fly height control signal 42.

In the embodiment of FIG. 8, the fly height sensor 14 provides the dual purpose of detecting touchdown events via the touchdown detector 66, as well as providing a suitable signal for defect scanning the disk. By multiplexing the read signal 12 and the fly height signal 16 over the same transmission line 22, the read channel 46 is able to sample both signals using a single sampling device 50 and sample buffer 52. The read signal samples may then be processed to demodulated the position information in the servo sectors $6_0$-$6_N$, and the fly height signal samples processed to detect defects on the disk as described above.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
 a disk comprising a plurality of servo tracks defined by servo sectors;
 a head actuated over the disk, the head comprising a read element configured to generate a read signal;

a fly height sensor configured to generate a fly height signal for the head; and control circuitry comprising a multiplexer configured to multiplex the read signal and the fly height signal to a first transmission line, the control circuitry configured to:

configure the multiplexer to select the read signal when reading the servo sectors of a servo track; and configure the multiplexer to select the fly height signal when reading a segment of the servo track between consecutive servo sectors.

2. The disk drive as recited in claim 1, wherein the control circuitry comprises:

a preamp circuit comprising the multiplexer; and a read channel circuit coupled to the first transmission line.

3. The disk drive as recited in claim 2, wherein the read channel comprises:

a sampling device configured to sample the read signal when reading the servo sectors and configured to sample the fly height signal when reading the segment of the servo track; and a buffer configured to buffer signal samples generated by the sampling device.

4. The disk drive as recited in claim 2, wherein the preamp comprises:

a touchdown detector configured to detect a touchdown event in response to the fly height signal; and a second transmission line configured to transmit the touchdown event to the read channel.

5. The disk drive as recited in claim 1, wherein the control circuitry is further configured to detect a defect on the disk in response to the fly height signal.

6. The disk drive as recited in claim 5, wherein the control circuitry is further configured to detect the defect on the disk by detecting a slope of the fly height signal.

7. The disk drive as recited in claim 5, wherein the control circuitry is further configured to detect the defect on the disk by comparing the fly height signal to a threshold.

8. The disk drive as recited in claim 5, wherein the control circuitry is further configured to detect the defect on the disk by correlating the fly height signal with a defect signal representing a defect type.

9. The disk drive as recited in claim 8, wherein the defect type comprises a thermal asperity.

10. The disk drive as recited in claim 1, wherein the fly height sensor comprises a touchdown sensor.

11. The disk drive as recited in claim 10, wherein the touchdown sensor comprises a magnetoresistive element.

12. A method of operating a disk drive, the disk drive comprising a disk comprising a plurality of servo tracks defined by servo sectors, a head actuated over the disk, the head comprising a read element configured to generate a read signal, a fly height sensor configured to generate a fly height signal for the head, and a multiplexer configured to multiplex the read signal and the fly height signal to a transmission line, the method comprising:

configuring the multiplexer to select the read signal when reading the servo sectors of a servo track; and configuring the multiplexer to select the fly height signal when reading a segment of the servo track between consecutive servo sectors.

13. The method as recited in claim 12, further comprising:

sampling the read signal when reading the servo sectors and sampling the fly height signal when reading the segment of the servo track; and buffering the signal samples generated by sampling the read signal and the fly height signal.

14. The method as recited in claim 12, further comprising detecting a defect on the disk in response to the fly height signal.

15. The method as recited in claim 14, further comprising detecting the defect on the disk by detecting a slope of the fly height signal.

16. The method as recited in claim 14, further comprising detecting the defect on the disk by comparing the fly height signal to a threshold.

17. The method as recited in claim 14, further comprising detecting the defect on the disk by correlating the fly height signal with a defect signal representing a defect type.

18. The method as recited in claim 17, wherein the defect type comprises a thermal asperity.

19. The method as recited in claim 12, further comprising detecting a touchdown event in response to the fly height signal, wherein the touchdown event is detected when the head contacts the disk.

* * * * *